United States Patent
Smithey et al.

[11] Patent Number: 6,140,012
[45] Date of Patent: Oct. 31, 2000

[54] BACTERIORHODOPSIN PREPARATIONS HAVING INCREASED INFORMATION STORAGE TIMES

[75] Inventors: Daniel T. Smithey; Brenda M. Simpson, both of Bend, Oreg.

[73] Assignee: Bend Research, Inc., Bend, Oreg.

[21] Appl. No.: 09/075,982

[22] Filed: May 11, 1998

[51] Int. Cl.[7] .................................................. G11B 7/24
[52] U.S. Cl. .................. 430/270.14; 430/2; 430/945; 430/1; 359/3
[58] Field of Search ..................... 430/1, 2, 270.14, 430/945; 359/1, 3

[56] References Cited

U.S. PATENT DOCUMENTS

| | | | |
|---|---|---|---|
| 4,804,834 | 2/1989 | Katsura et al. | 250/211 R |
| 5,064,264 | 11/1991 | Ducharme et al. | 430/59 |
| 5,079,149 | 1/1992 | Neumann et al. | 435/712 |
| 5,252,719 | 10/1993 | Takeda et al. | 530/409 |
| 5,260,559 | 11/1993 | Miyasaka et al. | 250/208.1 |
| 5,470,690 | 11/1995 | Lewis et al. | 430/21 |
| 5,518,858 | 5/1996 | Dyukova et al. | 430/945 |
| 5,872,648 | 2/1999 | Sanchez et al. | 359/290 |

FOREIGN PATENT DOCUMENTS

| | | |
|---|---|---|
| 0 417 542 A2 | 3/1991 | European Pat. Off. . |
| 0 388 213 B1 | 8/1994 | European Pat. Off. . |
| 94/05008 | 3/1994 | WIPO . |

OTHER PUBLICATIONS

Sigrist, H, et al., "Heterobifunctional crosslinking of Bacteriorhodopsin by azidophenylisothiocyanate" FEBS Lett., vol. 113(2), pp. 307–311, May 1980.

*Primary Examiner*—Martin Angebranndt
*Attorney, Agent, or Firm*—Chernoff, Vilhauer, McClung & Stenzel, LLP

[57] ABSTRACT

Bacteriorhodopsin materials and matrices are crosslinked with each other to enhance optical data storage lifetimes.

24 Claims, 1 Drawing Sheet

BACTERIORHODOPSIN PREPARATIONS HAVING INCREASED INFORMATION STORAGE TIMES

This invention was made with government support under Contract No. NAS 2-14343, awarded by the National Aeronautics and Space Administration.

BACKGROUND OF THE INVENTION

Bacteriorhodopsin (BR) is a protein found in the cell membrane of Halobacterium halobium, a bacterium found naturally in environments having extremely high salt concentrations. The BR molecule can be isolated from the bacteria in the form of two-dimensional, highly organized sheets called "purple membrane." These sheets are the thickness of the BR molecule (about 50 Å) and have an average area of 1 $\mu m^2$.

Purple membrane sheets are in most cases crystalline, having a two-dimensional hexagonal close-packed structure. At each crystal lattice site there are three BR molecules present (a trimer). Each purple membrane sheet contains 10,000 to 100,000 BR molecules, depending on its overall size. Purple membrane also contains other molecules, known as lipids, which are important to its structure and stability. Lipids comprise about 15% of the total weight of the sheet.

The BR molecule itself consists of two parts: (1) the retinal (or chromophore) component; and (2) the opsin component, which surrounds the retinal component. The BR molecule, unlike many proteins, is exceedingly stable, both to light and to heat. This stability arises primarily from the two-dimensional crystallinity of the purple membrane and from the cage effect of the opsin on the light-sensitive retinal component. Such crystallinity lends stability to the trimeric structure of the protein, and in fact denaturation occurs only at high temperatures and in extreme chemical environments. For example, the protein is stable above 70° C. in an aqueous environment, and can be subjected to pH ranging from 1.0 to 12.0. Furthermore, the retinal chromophore is unusually photostable, because it is held tightly within a pocket inside the protein. The stability of BR makes it uniquely suited toward many practical optical recording applications.

Purple membrane BR is often referred to as the "normal" form of BR since it is found under near-neutral pH and naturally occurring cation concentrations. When BR is exposed to light within its absorption spectrum, the absorption of a photon induces several successive changes to both the retinal and the opsin components, which translate into many different photochromic shifts. These photochromic shifts are strongly correlated with (1) the configuration of the retinal component (trans or cis), (2) the conformational changes of the opsin component (and thus the local charge environment near the retinal component), and (3) the deprotonation/reprotonation of the Schiff base and its counter-ions.

BR materials can be modified or engineered by making alterations in the amino acid sequence of the "native" BR molecule using site-specific mutagenesis. These modifications can change the photochromic effects dramatically. For example, a widely investigated alteration, the D96N strain, in which an asparagine amino acid has been substituted for aspartate, leads to a dramatically lengthened photochromic lifetime by impeding the reprotonation of the Schiff base. See Downie and Smithey, 21 Opt. Lett. 680 (1996).

When BR in its initial BR570 state is illuminated with visible light having a wavelength near 570 nm, a transient change in the absorbance spectrum occurs, which is referred to as a "photocycle." Photoisomerization of the retinal component occurs from all-trans to 13-cis, with a quantum efficiency of nearly 70%. This leads to a deprotonation of the Schiff base, which causes a substantial shift of the absorbance peak to 410 nm (the M410 state). This is normally the longest-lived state in the photocycle of BR and storage times of several minutes have been reported, but it can be as short as a few milliseconds. See PCT Application No. 93/11470. The BR molecule returns to its initial BR570 state from the M410 state either thermally, or by using blue light to initiate the conversion back to BR570.

The use of BR optical recording materials to record information optically is known in the art. See, for example, U.S. Pat. Nos. 5,470,690, 5,346,789 and 5,374,492 and European Patent No. 487099; see also Downie and Smithey, Ibid.; Downey and Smithey, 35 Appl. Opt. 5780 (1996); and Oesterhelt et al., 24 Q. Rev. Biophysics 425 (1991). Such materials are made by solution-casting, spin-casting, or electro-deposition processes. These materials are used to record information optically, by imaging a pattern into the material using light, and are fully erasable, and so are reusable. The method by which information is recorded is via photochromic processes, i.e., by changes in color of the material upon exposure to light. These materials are useful for holography, digital and analog optical data storage, optical correlators, spatial light modulators, displays, optical switches, optical interconnects, and any other application where the recording or control of light is required.

Optical recording materials have a large number of rigorous performance requirements for use in high-resolution recording, such as optical data storage and holography. A key requirement is the ability to record temporally, physically, and chemically stable spatial patterns that are near the diffraction limit of the recording light, which requires sub-micron resolution. BR materials are promising candidates as high-resolution optical-recording materials. While it is known in the art that BR molecules can record temporally and chemically stable information, bulk materials have not been shown to be physically stable, i.e., the BR molecules migrate over time within a bulk matrix such as a thin film. Such migration destroys optically recorded spatial patterns such as holograms, diffraction gratings and closely-spaced micron-sized bit patterns.

Most of the work on optical device-related applications has relied upon native or genetically engineered BR within the framework of the traditional photocycle, i.e., with use of the purple membrane form. This being the case, recording is achieved primarily by generating the M410 state from the BR570 state. Patterns are first written by photobleaching the BR570 state. The patterns can then be read as positives (with light falling in the spectral region of BR570) or as negatives (by reading with blue light in the spectral region of M410).

Much less is known about another form of BR known as blue membrane. When native BR is either deionized or placed in a low-pH environment (pH<2.6), a dramatically different photocycle and absorbance spectrum result. Blue membrane BR does not form an M410 state or induce a deprotonation of the Schiff base. The initial state of blue membrane, the BR605 state, has an absorbance profile with maximum absorbance at 605 nm.

Genetically engineered BR mutants, such as D85N, D85E, D85Q, R185Q, and many others have similar behavior to that exhibited by low-pH native BR. Some of these BR mutants only exhibit blue membrane forms, i.e., they do not have purple membrane photocycles in any chemical or physical environments.

The photocycle of blue membrane has only two possible states. These states are referred to as the P490 state and the Q390 state, named for the wavelength of their maximum absorbance peaks. The P490 state is photoinduced, while the Q390 state is thermally induced from the P490 state. The rate of conversion from the P490 state to the Q390 state is extremely slow, occurring over several hours at room temperature, but depends on the BR variant that is used. The Q390 state is thermally stable and does not decay in the dark, and so allows relatively permanent recording so long as it is not acted upon by blue light (which causes reversion to the initial BR605 state).

Unlike purple membrane BR materials which have lifetimes that are on the order of hours for the M410 state, blue membrane BR materials have photochromic states (both the P490 and the Q390 states) which are long-lived, exhibiting photochromic lifetimes that are greater than several months. However, just as is the case with purple membrane, the BR molecules within a given matrix tend to diffuse, thereby substantially diminishing the capacity of both types of membrane to permit long-term storage of optical data.

While the prior art discloses a number of methods for the preparation of materials based on BR, none of these methods yield materials which are suitable for long-term storage of optical data. For example, U.S. Pat. No. 5,470,690 describes a process to produce BR materials which have relatively long recording lifetimes using high pH suspensions of polyvinyl alcohol. However, these materials have relatively short photochromic lifetimes, on the order of a few hours. U.S. Pat. No. 5,374,492 describes purple membrane preparations having increased holographic diffraction efficiency by using a genetically engineered mutant which has modifications to amino acid 96 in the BR molecule and uses a proton donor additive having 1–30 wt % water. This preparation has improved diffraction efficiency due to large differences between the initial and the photoinduced absorbance spectra. However, these materials also suffer from limited lifetimes, typically less than a few minutes.

U.S. Pat. No. 5,518,858 describes a photochromic composition comprising an aqueous BR suspension, at least one nitrogen-containing compound, a detergent, and a gelatin binder. This material is claimed to have greater sensitivity to recording light. Again, however, these materials have relatively short lifetimes of less than an hour. PCT Application No. 94/05008 describes fluid compositions of purple membrane BR having increased memory time of more than a day. However, as fluid compositions, they permit relatively fast diffusion of BR molecules through the matrix, thereby thwarting the possibility of long-term storage of optical data.

It is well known that BR molecules can be intramolecularly crosslinked, i.e., whereby the long protein chains are crosslinked to themselves by crosslinking the amino acids within individual molecules in a purple membrane. Packer et al., 145 Biochem. Biophys. Res. Commun. 1164 (1987). These studies indicate that such intracrosslinking of the BR molecule can extend BR's photochromic lifetimes. Sherman et al., 265 Nature 273 (1977).

European Patent Application No. 90 116479.8 describes crosslinking to stabilize an oriented layer of BR for photovoltaic applications such as solar batteries and photosensors, which require protein-oriented BR in order to obtain a photovoltage output from a bulk oriented film. If the protein in the BR film is not oriented, no photovoltage is generated, thus rendering the film useless for its intended purpose. The crosslinking is used to prevent the BR molecules from dissolving in aqueous solutions or from cracking and falling apart after the protein therein has been oriented, which would also render the device useless for its intended purpose.

SUMMARY OF THE INVENTION

Figure 1:
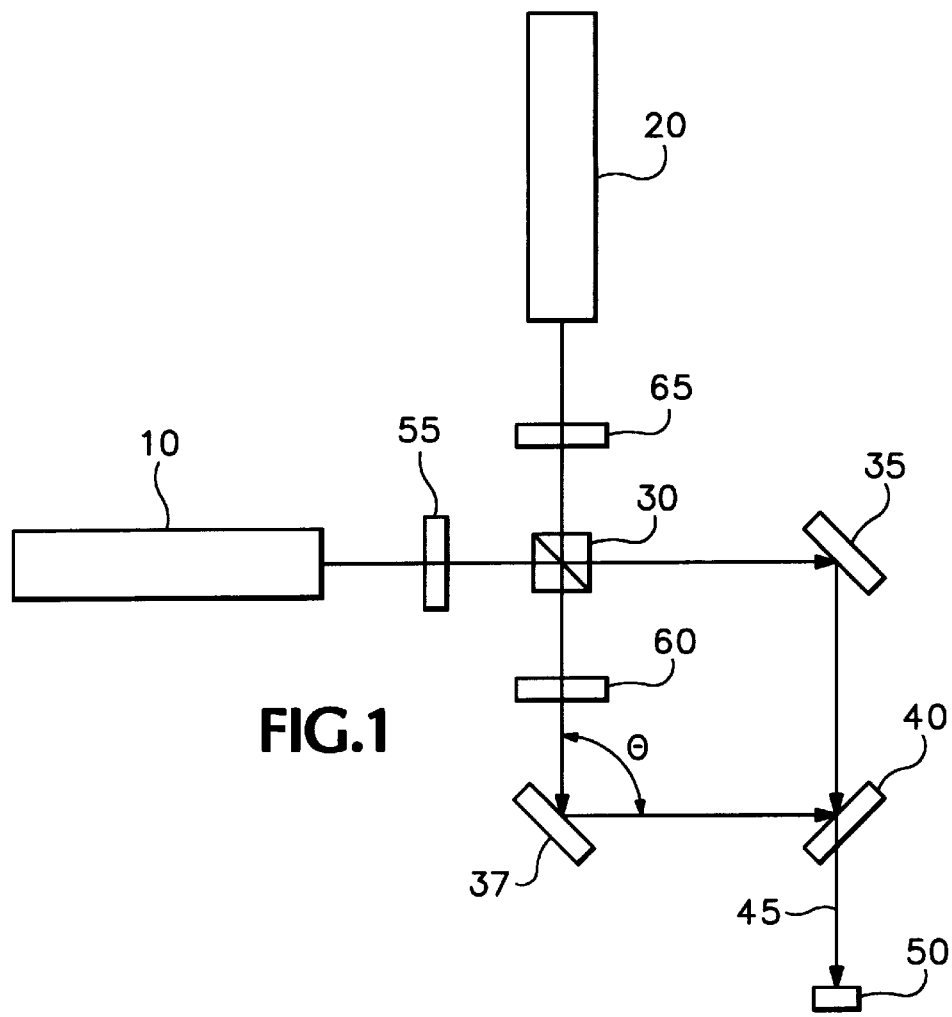
FIG. 1 is a schematic showing equipment used to test the optical data storage capacity of BR media.

The essence of the invention comprises crosslinking BR molecules to other BR molecules or to a host matrix or to both, to render the so-treated BR capable of an increased optical recording lifetime. The invention is suitable for use when the diffusion time of BR molecules is faster than the photochromic decay process of the BR molecules, and so applies to both purple and blue membrane materials. The invention is particularly advantageous when blue membrane materials are used since these materials exhibit the longest lifetimes. For optical recording applications which must be performed at high temperatures, where diffusion is faster, relatively short lifetime purple membrane BR materials would also benefit from crosslinking.

DETAILED DESCRIPTION OF THE PREFERRED EMBODIMENT

Films, blocks, etc. of the crosslinked BR material are made by fabricating monomeric or trimeric BR, either in the form of blue or purple membrane or mutants thereof, into desired shapes useful for optical recording. The material can be formed with BR alone or with BR combined with a crosslinkable polymer matrix, particularly with a hydrophilic polymer matrix. Exemplary hydrophilic crosslinkable polymer matrices include, without limitation, gelatin, polyvinyl alcohol, polyvinyl pyrrolidone and polylysine. Exemplary non-hydrophilic polymers include epoxies, polymethacrylates, polysiloxanes, and organic/inorganic hybrids.

For purposes of the invention, a crosslinker may be defined as any polyfunctional organic molecule that can react with (1) the amino acid portion of a BR-based composition or (2) with a host polymer matrix or (3) with both (1) and (2), leading to linkages between separate BR molecules and/or the host polymer matrix. Exemplary monomeric crosslinkers include formaldehyde, dialdehydes, diamines, epoxides, isocyanates, azitidiniums amide, amine, carboxyl, hydroxyl, sulfhydril and carbodiimides.

Polymeric crosslinking agents may also be used and have the advantage of being able to bridge large gaps between reactive groups. This may be useful in the case of dilute BR materials, i.e., where there are a small number of BR molecules per unit volume, such as with thick BR materials. Some examples of polymeric crosslinkers include commercially available crosslinking resins from Hercules Corporation of Wilmington, Del. which contain epoxide and azitidinium functional groups, including the Polycup™ series, Hercules™ series, Kymene™ series, Hercosett™ series, and Delsette™ series. These polymeric crosslinkers do not deactivate in water and all have functional groups which react with alcohols, polyols, secondary amines, tertiary amines, hydroxyls, carboxyls, and sulfides. Amino acid side chains present both in gelatin and in BR which will react with these crosslinkers include amines (lysine, arginine and histidine), alcohols (hydroxyproline, threonine and serine), carboxylic acids (aspartic acid and glutamic acid), amides (asparagine and glutamine) and sulfhydril groups (cysteine).

To obtain a long-lived optical data recording and storing medium in accordance with the invention, the following fabrication steps are preferred: (1) forming a suspension by combining a single BR material or groups of different BR materials with a polymer matrix, a crosslinker, an optional pH buffer, and an optional plasticizer, where the BR materials are monomeric or trimeric and in the form of purple or blue membrane, where the crosslinker may be any polyfunctional compound capable of reacting with amines, carboxylic acids, hydroxyls, and other functional groups on the BR molecule and on the polymer matrix; (2) forming, casting, spin-coating, or molding a film or bulk structure from this suspension; (3) drying the resulting structure to a preliminary water content; (4) curing the structure; (5) rewetting the structure to the desired permanent water content; and (6) sealing the structure between transparent substrates to retain the desired water content.

An especially preferred fabrication route is to combine 10 wt % gelatin, 3 wt % plasticizer, 5 wt % crosslinker, the required wt % (based on the desired optical density desired) purple or blue membrane materials, such as D85N, D85E, or low pH (~3) native BR, and the balance water. The resulting suspension is mixed, cast, and dried to a controlled humidity level, typically 10 wt % water.

The key advantage of the resulting media is long-term storage capacity of recorded optical information. This long-term storage capacity is due to elimination of BR molecular displacement or diffusion over time. If such molecular displacement is not eliminated, optical data previously recorded via localized molecules of BR is lost due to the otherwise spontaneously occurring molecular diffusion/displacement. Without crosslinking, such molecular displacement severely restricts the types of materials that can be fabricated since this displacement increases as the level of plasticization of the material matrix increases. By crosslinking, a greater range of materials which are highly plasticized, i.e., hydrated, can be fabricated. For example, a large amount of water (~10%) is known to greatly improve both recording sensitivity and achievable contrast in BR materials. Thus, other advantages of the resulting media include increased sensitivity to recording light and sharp contrast between those areas that are exposed to the recording light and those areas not exposed. Such sharp contrast leads to much improved diffraction efficiency, a key measure of optical data storage capacity.

To compare the optical data storage lifetime of a crosslinked BR films to that of an non-crosslinked BR film, it is desirable to record diffraction gratings into BR films. Diffraction gratings are recorded into a BR film by crossing two laser beams from a Krypton ion gas laser. The sinusoidal interference pattern created by the crossing lasers creates a corresponding sinusoidal modulation in the absorbance and refractive index of the BR film by the photochromic response of the BR film. By measuring the lifetime of such a recorded photochromic grating for both crosslinked and non-crosslinked BR materials, the impact of the crosslinking on optical data storage lifetime may be determined.

EXAMPLE 1

Preparation of Gluteraldehyde-crosslinked Native Purple Membrane in Gelatin Matrix A gelatin solution was made by mixing 1 g of photographic grade, base-catalyzed gelatin (Eastman, Rochester, N.Y.) with 0.1 g of glycerol (as plasticizer) and 8.8 g of distilled water. This mixture was stirred in a 40° C. water bath until a homogeneous solution was formed. This solution was filtered using a 2-micronpore size filter. Lyophilized Native BR (36.4 mg) was added to a 4 mL aliquot of the filtered gelatin solution and stirred overnight at 40° C., which yielded a homogeneous suspension. This suspension was filtered through a 3-micron syringe filter and 4.5 mL of a 50 wt % gluteraldehyde solution (Aldrich) was added and mixed for 5 minutes. The suspension was then cast into a mold consisting of a 1-inch plastic O-ring mounted to a 1¼-inch glass plate. The film was dried overnight under ambient conditions and the O-ring removed. A sample of this material was then placed in a water bath at 40° C. and stirred overnight. The BR gelatin medium did not dissolve nor did the BR materials diffuse through the polymer matrix, indicating that crosslinking of BR to other BR protein chains and to the gelatin matrix was achieved. A separate sample of the film was then hydrated for 12 hours in a chamber kept at 100% humidity. A layer of UV-curable optical epoxy (Norland 68) was applied to the film. Next, a 1¼-inch diameter glass plate was put on top of the film and the epoxy was cured with UV light.

EXAMPLE 2

Preparation of Gluteraldehyde-Crosslinked D85N Blue Membrane in Gelatin Matrix

The genetically engineered BR variant D85N was used. This BR mutant is a member of the class of BR materials known as blue membrane. A gelatin solution was made as in Example 1. Lyophilized D85N BR (35 mg) was added to a 4 mL aliquot of the filtered gelatin solution and stirred overnight at 40° C., to yield a homogeneous suspension. This suspension was filtered as in Example 1 and gluteraldehyde-crosslinked and molded as in Example 1. The so-formed medium did not dissolve, nor did the BR materials diffuse through the polymeric matrix, indicating that intermolecular and BR-matrix crosslinking was achieved. The film was then hydrated and a sample prepared as in Example 1.

EXAMPLE 3

Preparation of Crosslinked D85N Blue Membrane in Gelatin Matrix using Polymeric Crosslinker A solution was formed by mixing 20 wt % gelatin with 10 wt % glycerol, 10 wt % Kymene™ 557H crosslinker (Hercules Corporation) having epoxide and azitidinium reactive groups, balance water. After addition of 35 mg of lyophilized D85N BR to a 4 mL aliquot of the crosslinker solution, the resulting solution was cast onto a glass plate and allowed to dry at ambient temperatures. The BR/matrix material was then heated in an oven at 40° C. to drive off more water and to increase the reaction rate between the crosslinker, the BR and the gelatin matrix. Films of crosslinked BR materials were then hydrated for 12 hrs in a chamber kept at 100% humidity. No change in the absorbance spectra of the BR materials was observed after crosslinking and hydrating when compared to an uncrosslinked D85N BR film prepared under identical conditions as the crosslinked sample. The materials were then placed in a water bath at 40° C. and stirred overnight. The crosslinked BR materials did not dissolve nor did the BR materials diffuse through the polymer matrix, indicating that intermolecular and BR-matrix crosslinking was achieved.

EXAMPLE 4

Preparation of Crosslinked Blue Membrane Films

A crosslinking solution was made by combining 500 mg of Kymene™ 557H polymeric crosslinker with 1 mL of distilled water. This mixture was stirred in a 40° C. water bath until a homogeneous solution was formed. The pH of this solution was adjusted to 8.0 using NaOH. Ten mg of lyophilized D85N BR was added to the crosslinking solution and the pH was readjusted to 8.0. This solution was then stirred overnight at 40° C., which yielded a homogeneous suspension. The solution was then cast as films into molds. The molds consisted of 1-inch plastic O-rings mounted to microscope slides. The resulting films were dried overnight under ambient conditions and the O-rings were removed. The films were then heated in an oven at 70° C. for 48 hours. A sample of this material was then placed in a water bath at 40° C. and stirred overnight. The BR materials did not dissolve after continuous stirring, indicating crosslinking had taken place. A non-crosslinked control sample dissolved within a few minutes. A sample of the crosslinked BR-containing water bath was checked in a spectrophotometer for a BR absorbance profile. No BR absorbance was detected, indicating that the BR did not diffuse out of the crosslinked film.

EXAMPLE 5

Preparation of Crosslinked Blue Membrane and Polyvinyl Alcohol (PVA) Films

A crosslinking solution was made by combining 100 mg of Polycup 172 polymeric crosslinker with 1 mL of distilled water. This mixture was stirred in a 40° C. water bath until a homogeneous solution was formed and its pH was adjusted to 8.0 with NaOH. A 10% solution of PVA (87–89% hydrolyzed, MW 13,000–23,000, Aldrich Chemical, Milwaukee, Wis.) was prepared and the pH of this solution was adjusted to 8.0. Ten mg of lyophilized D85N BR was added to 1 mL of the PVA solution and the pH readjusted to 8.0. This solution was then stirred at 40° C. until a homogeneous suspension was achieved. One hundred $\mu$L of the crosslinking solution was then added to the PVA solution. The resulting combination of solutions was stirred and then cast into a mold and post-treated as in Example 4. The BR materials did not dissolve in the stirred water bath, indicating crosslinking. A non-crosslinked control sample dissolved within a few minutes. A sample of the water bath was checked as in Example 4 for of BR absorbance with the same results indicating that the BR did not diffuse out of the crosslinked film.

EXAMPLE 6

The following example demonstrates that crosslinking BR materials enables longer optical storage lifetimes as compared to an identical non-crosslinked BR material. The experimental setup for recording and reading holographic diffraction grating in a BR film matrix 40 is shown in FIG. 1. The recording and reading laser 10 was a 100 mW Krypton laser with a wavelength of 676 nm. An erasing laser 20, consisting of a second blue light Helium Cadmium 20 mW laser operating at 442 nm, was used to erase the recorded diffraction grating image so as to allow another photocycle, as desired. The diameter of both laser beams was 3 mm, while the angle of intersection θ of the two beams was 90°. Shutters 55, 60 and 65 are used to control the light. To record a holographic grating image, Shutters 55 and 60 are held open while shutter 65 is closed. To read the diffraction grating image, Shutters 60 and 65 are closed while shutter 55 is open. The intensity of the Krypton recording and reading laser beam 10 is reduced to 10 mW when reading the recorded grating, preventing the reading laser from distorting or erasing the image. The diffracted beam 30 is detected with a photodiode 40 and the signal from the photodiode is monitored over time. To erase the diffraction grating image, shutters 60 and 65 are open while shutter 55 is closed.

Figure 2:
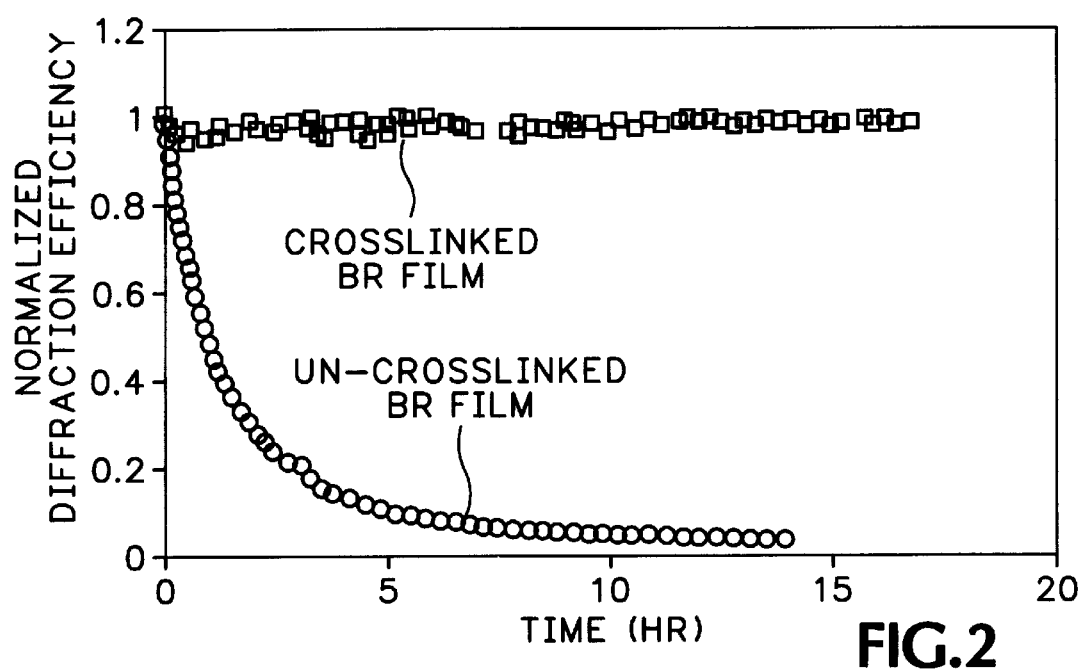
FIG. 2 is a graph showing the diffraction efficiency (a measure of optical data storage capacity) of crosslinked and non-crosslinked BR media.

A photoactive medium of the D85N mutant of BR blue membrane was crosslinked as in Example 2 and a second sample was prepared in the same manner except no crosslinker was added. Both samples contained the same wt % water in the matrix. The diffraction efficiency of the two samples was then measured with the apparatus noted above and schematically shown in FIG. 1. The results are shown in FIG. 2, showing the diffraction efficiency of the two BR films as a function of time, clearly demonstrating a dramatic enhancement of diffraction efficiency due to crosslinking and therefore of temporal optical data storage capacity. Note that the diffraction efficiency of the non-crosslinked medium showed an approximately 80% decay within 2½ hours, while that of the crosslinked sample remained unchanged at 100% efficiency for 17 hours.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An optical data recording medium comprising a non-oriented protein selected from the group consisting of bacteriorhodopsin and mutants thereof, said protein having its protein chains crosslinked to a non-bacteriorhodopsin polymeric matrix.

2. The medium of claim 1 wherein said protein comprises purple membrane bacteriorhodopsin.

3. The medium of claim 1 wherein said protein comprises blue membrane bacteriorhodopsin.

4. The medium of claim 3 wherein said protein comprises the mutant D85N bacteriorhodopsin.

5. The medium of claim 1 wherein said polymeric matrix is hydrophilic.

6. The medium of claim 5 wherein said polymeric matrix is gelatin.

7. The medium of claim 1 wherein crosslinking is achieved with a crosslinking agent that reacts with amino acid molecules within said protein.

8. The medium of claim 1 wherein crosslinking is achieved with a crosslinking agent that reacts with said polymeric matrix.

9. The medium of claim 1 wherein crosslinking is achieved by a crosslinking agent that is reactive both with amino acid molecules within said protein and with said polymeric matrix.

10. The medium of claim 1 wherein said crosslinking is achieved by a polymeric crosslinking agent.

11. The medium of claim 1 wherein said crosslinking is achieved with a crosslinking agent that contains at least one reactive group selected from the group consisting of aldehyde, amide, amine, epoxide, carboxyl, hydroxyl and urea.

12. The medium of claim 1 wherein said crosslinking is achieved with a crosslinking agent selected from the group consisting of alkynes, borates, dichromates and sulfhydrils.

13. A method of extending the temporal optical data storage capacity of a non-oriented protein selected from the group consisting of bacteriorhodopsin and mutants thereof comprising crosslinking the protein chains of said protein to a non-bacteriorhodopsin polymeric matrix.

14. The method of claim 13 wherein said protein comprises purple membrane bacteriorhodopsin.

15. The method of claim 13 wherein said protein comprises blue membrane bacteriorhodopsin.

16. The method of claim 15 wherein said protein comprises the mutant D85N bacteriorhodopsin.

17. The method of claim 13 wherein said polymeric matrix hydrophilic.

18. The method of claim 17 wherein said hydrophilic polymeric matrix is gelatin.

19. The method of claim 13 wherein said crosslinking is achieved with a crosslinking agent that reacts with amino acid molecules within said protein.

20. The method of claim 13 wherein said crosslinking is achieved with a crosslinking agent that reacts with said polymeric matrix.

21. The method of claim 13 wherein said crosslinking is achieved by a crosslinking agent that is reactive both with amino acid molecules within said protein and within said polymeric matrix.

22. The method of claim 13 wherein said crosslinking is achieved by a polymeric crosslinking agent.

23. The method of claim 13 wherein said crosslinking is achieved with a crosslinking agent that contains at least one reactive group selected from the group consisting of aldehyde, amide, amine, epoxide, carboxyl, hydroxyl and urea.

24. The method of claim 13 wherein said crosslinking agent is selected from the group consisting of alkynes, borates, dichromates and sulfhydrils.

* * * * *